UNITED STATES PATENT OFFICE.

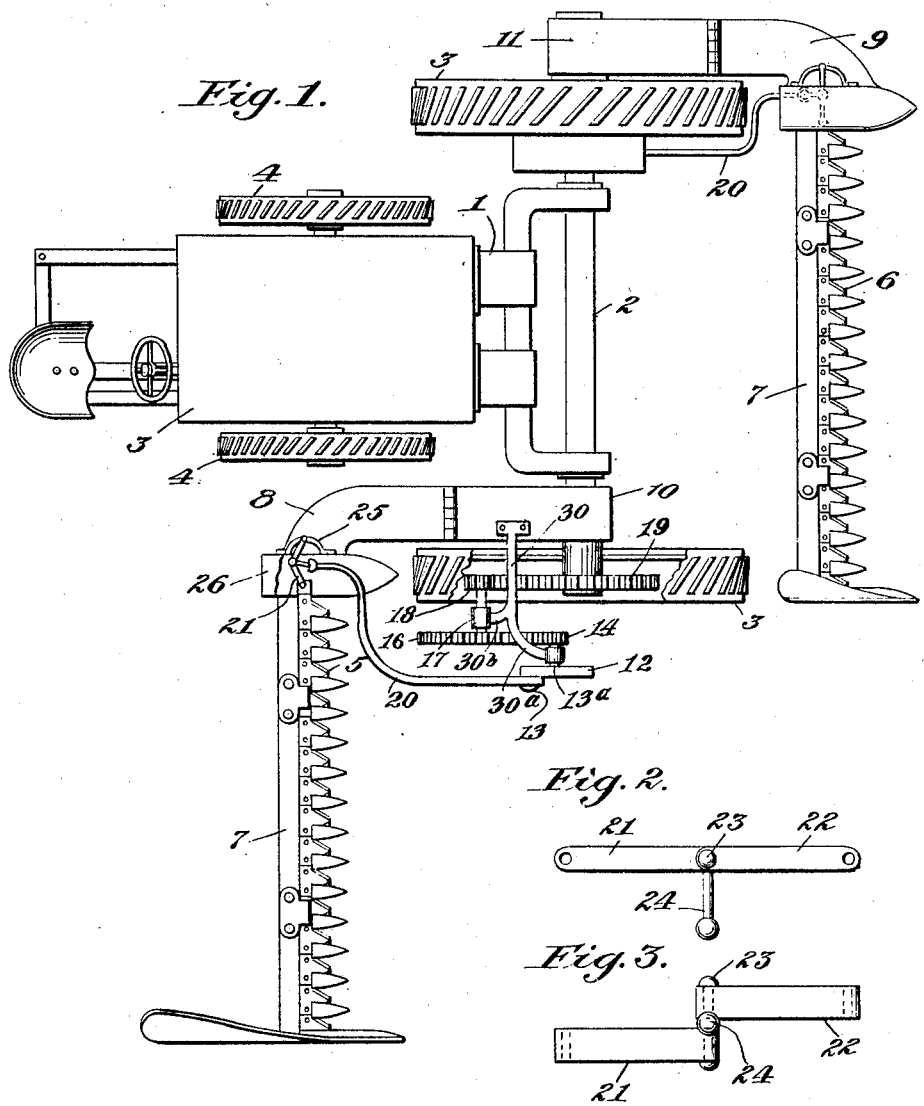

JAMES SAMUEL WHEELER, OF LOS ANGELES, CALIFORNIA.

MOWING-MACHINE.

1,358,351.  Specification of Letters Patent.  Patented Nov. 9, 1920.

Application filed December 26, 1918. Serial No. 268,370.

*To all whom it may concern:*

Be it known that I, JAMES S. WHEELER, a citizen of the United States, and a resident of Los Angeles, in the county of Los Angeles and State of California, have invented certain new and useful Improvements in Mowing-Machines, of which the following is a specification.

My invention is an improvement in mowing machines, and has for its object to provide a new and improved form of connection between the sickle blade and the mowing mechanism therefor, and especially adapted for use with multiple sickle machines of the tractor type.

In the drawings:

Figure 1 is a top plan view of a mowing machine of the multiple sickle type, provided with the improved connection;

Fig. 2 is a top plan view of the connection;

Fig. 3 is a front view of the same.

In the present embodiment of the invention the frame 1 of the mowing machine has the usual front axle 2, supported by the wheels 3. At the rear of the frame is the motor 3, which drives the traction wheels 4, and a plurality of sickle blades 5 and 6 is provided, each suitably mounted and connected to the machine.

The sickle 6 is arranged in front of the wheels thereof, and the sickle blade 5 is arranged lateral to the said wheels, being in rear of the said wheels as shown. The sickles 5 and 6 may move on the usual finger supporting bars 7, and these bars are connected at one end to the outer sections 8 and 9 of arms 8—10 and 9—11, respectively, supported by the axle 2, in such manner that the free ends of the finger guards may swing upwardly or downwardly to bring the sickles into or out of cutting position.

The other sections 10 and 11 of the arms 8—10 and 9—11 are mounted upon the axle 2, the section 11 being at the left of the machine frame and outside of the adjacent wheel, while the section 10 is at the right of the frame and inside the adjacent wheel.

Each sickle is operated from the adjacent wheel. The operating mechanism at the right of the frame in Fig. 1 is shown uncovered by its housing, while at the left it is shown covered by the housing. The construction and connection is, however, the same. A disk 12 is mounted adjacent to each wheel, and on that face of the wheel adjacent to the sickle. Each disk is secured to a shaft $13^a$ supported by one of the arms $30^a$ of a bracket 30 connected with the element 10, and extending above the wheel and outside of the same as shown. The shaft $13^a$ is provided at its inner end with a spur gear 14 meshing with a gear 16 on a counter shaft 17 which is journaled in another arm $30^b$ of the bracket 30.

Each shaft 17 is also provided with a spur gear 18 which meshes with the gear 19 on the axle, and each disk carries an eccentric wrist pin 13. A pitman 20 connects each disk with the adjacent sickle operating mechanism, the pitman being pivoted at one end to the wrist pin and connected at the other to the operating mechanism in a manner to be presently described.

The said connection comprises a species of toggle lever or hinge connection, each connection consisting of leaves or levers 21 and 22 which are pivotally connected at their meeting ends by a bolt or rivet 23. An arm or link 24 which is connected at one end by a ball and socket joint with the pitman 20 is pivoted at the other end to the connection 23 between the levers, and that end of the lever 21 remote from the connection 23 is pivoted to the sickle. That end of the lever 22 remote from the connection 23 is pivoted to the center of an arched substantially semi-circular arm or bracket 25, which is secured to the housing 26 for the connection 21—23—24 at the opposite side of the said sickle head or shoe from the sickle. This arm or bracket has its concave side toward the sickle, and it will be evident that the arrangement permits a free swinging movement of the lever 22. When the machine is in motion, the pitmen 20 will be reciprocated rapidly and for each complete reciprocation of a pitman there will be two complete reciprocations of the sickle, that is, when the pitman moves to the right of Fig. 1, for instance, from the position shown, the complete movement of the rod will move the sickle first in one direction and then in the other, so that there will be two cutting strokes of the sickle for each movement of the pitman in each direction.

I claim:

In a mowing machine of the multiple sickle type, the combination with the sickles and the shoes at the inner ends thereof, of an arm in connection with each shoe and connected to the machine to permit the sickle and arms to be swung upwardly or downwardly, an arched bracket in connection with each shoe and arranged with its concave surface toward the sickle, a pair of levers pivotally connected at their adjacent ends and pivoted at their remote ends to the bracket and to the sickle respectively, and means connected with the pivotal connection between the levers for swinging the same to operate the sickle.

JAMES SAMUEL WHEELER.

Witnesses:
J. W. BUSTER,
W. H. GUNTHER.